Jan. 22, 1952 W. H. ANDERSON ET AL 2,583,133

VARIABLE INDUCTANCE

Filed June 19, 1947

WITNESSES:

INVENTORS
William H. Anderson and
Albert C. Frey.
BY
ATTORNEY

Patented Jan. 22, 1952 2,583,133

UNITED STATES PATENT OFFICE 2,583,133

VARIABLE INDUCTANCE

William H. Anderson, Elkridge, and Albert C. Frey, Baltimore, Md., assignors to Westinghouse Electric Corporation, East Pittsburgh, Pa., a corporation of Pennsylvania Application June 19, 1947, Serial No. 755,756

6 Claims. (Cl. 171—242)

This invention relates to a variable inductance tuner for use in tuning a high frequency LC circuit, and it has for an object to provide improved apparatus of this kind.

Another object is to provide an improved variable inductance tuner comprising a flexible strap wherein the inductance is varied by varying the length of the strap.

Present day variable inductance strap tuners, of which we are familiar, are exemplified in the prior art by Patent No. 2,410,222, Lawrence. Lawrence varies the inductance of his device by altering the area embraced by a loop and hence the effective inductance of the strap comprising the loop. It is stated that this device will tune an LC circuit over a frequency range of at least 205 to 260 megacycles. This is a frequency ratio of 1.27:1. Since tuning inductance is inversely proportional to frequency squared $$\left(F=\frac{1}{2\pi\sqrt{LC}}\right)$$

Lawrence's variable inductance has a tuning ratio of $(1.27)^2:1=1.6:1$.

When it is desired to tune a parallel LC circuit comprising a capacitance which varies from, for example, 1500 M. M. F.-250 M. M. F., such as we do, in a manner which is explained more fully hereinafter, the capacity ratio is 1500/250=6:1. This means that a variable inductance to tune this circuit to parallel or anti-resonance must also have a tuning ratio of 6:1. This ratio is far beyond the range of the Lawrence device.

Accordingly, another object is to obviate the foregoing and other less apparent objections to the prior art strap type variable inductance tuners.

Another object is to provide a variable inductance strap type tuner having a relatively high tuning ratio.

Figure 1:
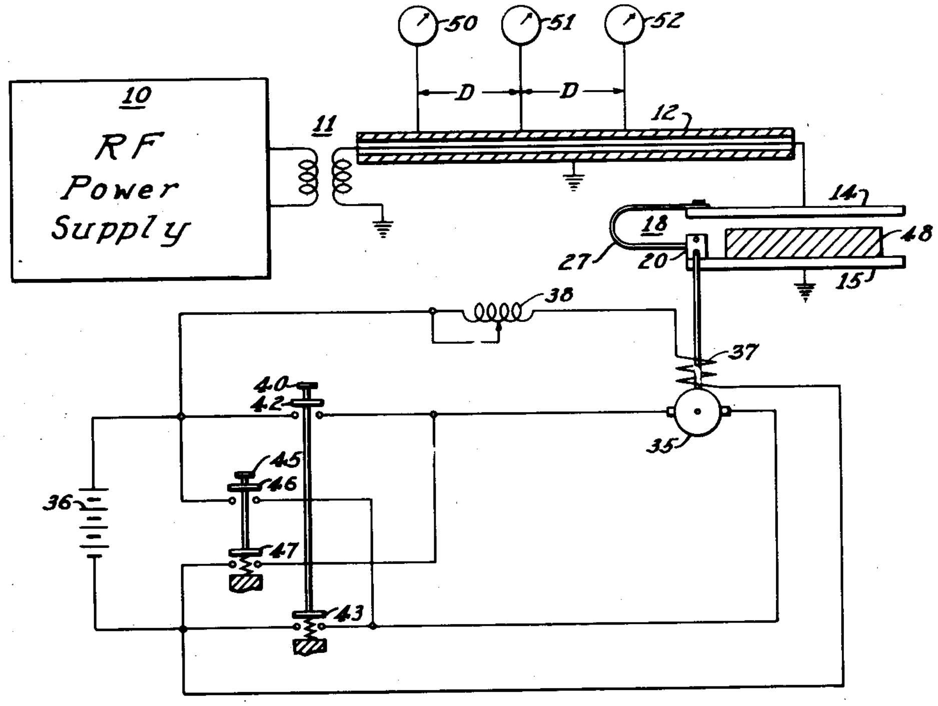
Figure 2:
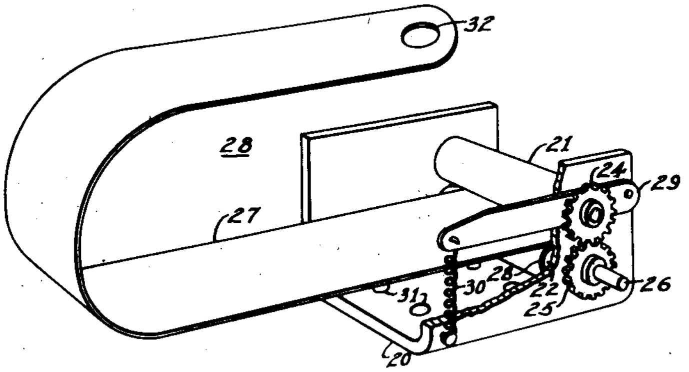

These and other objects are effected by our invention as will be apparent from the following description and claims taken in accordance with the accompanying drawing, forming a part of this application, in which:

Figure 1 is a schematic illustration of our invention adapted for tuning a high frequency dielectric heating circuit; and Fig. 2 is a partial perspective, with parts broken away for clarity of illustration, of our variable inductance tuner unit per se.

Referring to Fig. 1 in detail, for the purpose of illustration, we show our variable strap inductance tuner being installed for tuning a high frequency dielectric heating system. The heating system comprises a source 10 of high frequency oscillations which is connected by means of a transformer 11 and a coaxial cable 12 to a pair of spaced heating or energy utilizing electrodes 14 and 15.

In order to obtain optimum power transfer from the coaxial cable 12 to the heating or energy utilizing electrodes 14 and 15, the circuit comprising the electrodes 14 and 15 should present a terminating impedance looking into the cable 12 equal to the characteristic impedance of the cable 12. To tune or adjust the circuit so as to present the proper impedance to the cable 12, we employ our improved variable strap inductance tuner 18. It is seen that the electrodes 14 and 15 comprise the two plates of a condenser, which presents a capacitive reactance to the cable 12. We connect our variable strap inductance 18 across the electrodes 14 and 15 to present an inductive reactance to the cable 12. The parallel LC circuit comprising the electrodes 14 and 15 and the variable inductance 18 may be tuned to parallel or anti-resonance by adjusting the inductance 12. It is understood that the inductance 18 may be adjusted so that the LC circuit will present any desired terminating impedance to the cable 12.

Our variable strap inductance tuner 18 is best illustrated by Fig. 2. It comprises a bracket 20 which carries a pair of rolls 21 and 22. The roll 21 has a gear 24 mounted at one end thereof. The roll 22 has a gear 25 mounted on the corresponding end thereof so that it will ordinarily mesh with the gear 24. A shaft 26 extends from the roll 22 for rotating the same. When the roll 22 is rotated, rotary motion is also imparted to the roll 21 through the meshing gears 24 and 25. A substantially U-shaped flexible metal strap member 27 provides the variable inductance for our tuner 18. The strap 27 has one end attached to the roll 22 so that as the roll 22 is rotated in one direction the strap 27 is wound about the roll 22, as indicated at 28, and the effective length and the resulting inductance of the strap 27 is reduced. Correspondingly, when the roll 22 is rotated in the opposite direction, the strap 27 unwinds from about the roll 22 and thus increases its effective length and the resulting inductance. A lever 29 is attached to the roll 21 and pivoted to the bracket at 20. This lever is biased downwardly by a spring 30. This arrangement holds the roll 21 down firmly against the strap 27 and insures good tight winding of the strap 27 and good electrical contact between the strap 27 and the roll 22. The roll 22 also makes good electrical contact with the bracket 20.

The variable strap inductor 18 may be installed in a system such as illustrated in Fig. 1 by attaching the bracket 20 to the lower heating electrode 15 by rivets or bolts which extend through holes 31 provided in the bracket 20 and through the lower heating electrode 15. The other end of the strap may be attached to the upper electrode 14 by rivets or bolts which extend through a hole 32 therein and through the upper electrode 14. However, it is understood that the variable strap inductance 18 may be installed in a system in any other suitable manner.

When our variable strap inductor 18 is used to tune a system such as illustrated in Fig. 1, some suitable means such as a reversible electric motor 35 is employed for adjusting the strap 27. The motor 35 is connected to drive the shaft 26 to wind or unwind the strap 27 about the roll 22. A suitable source of power 36 is provided for operating the motor 35. A field winding 37 for the motor and a variac 38 for adjusting the motor field is provided in circuit with the motor 35 and the power source 36. A first push button 40 is provided in circuit with the motor 35 and the power source 36. When this push button is operated to close its associated sets of contacts 42 and 43, the motor 35 rotates in a direction to wind the strap 27 about the roll 22 and thus reduce the length of the strap and consequently reduce its effective inductance. A second push button 45 is provided in another circuit with the motor 35 and the power source 36. When this push button is operated to close its assciated pairs of contacts 46 and 47, the motor 35 operates in a direction to unwind the strap 27 from about the roll 22 and thus increase the length of the strap and consequently increase its effective inductance. It is understood that when the push buttons 40 and 45 are not held closed they are spring biased to open circuit position.

When using our variable strap inductor 18 in a system as illustrated in Fig. 1, a charge 48 to be heated is placed between the heating electrodes 14 and 15 and the tuner 18 is adjusted until the circuit comprising the heating electrodes 14 and 15 and the strap 27 is substantially parallel or anti-resonant. This condition is observed by three standing wave meters 50, 51 and 52 connected to the coaxial line 12 and spaced apart a distance D, which is approximately 1/4 wavelength of the oscillations being supplied from the source 10. When the impedance of the circuit comprising the electrodes 14 and 15 and the strap inductance 27 matches the impedance of the cable 12, the three standing wave meters will all indicate the same value of voltage. However, if the impedance of the circuit does not match the impedance of the cable 12, the meters 50, 51 and 52 will indicate different values. In such a case, the length of the strap 27 is adjusted until the standing wave meters all indicate the same value, which is an indication that the circuit comprising the electrodes 14 and 15 and the strap inductance 27 is properly terminated on the cable 12.

At the beginning of the heating operation, the capacitance of the electrodes 14 and 15 and the charge 48 is relatively large and a small amount of inductance is required to properly tune the circuit, in which instance most of the strap 27 is wound about the roll 22. However, as the charge 48 is heated, moisture is driven out of it and the dielectric constant of the charge decreases.

This decreases the capacitance of the circuit so that more inductance must be inserted to tune the circuit to present the proper impedance to the cable 12. This is accomplished by pressing the push button 45 to start the motor 35 to unwind the strap 27 from about the roll 22. In the meantime, the meters 50, 51 and 52 are being watched and as soon as they all indicate the same value of voltage the push button 45 is released to stop the motor 35 for the impedance of the circuit comprising the electrodes 14 and 15 and the strap 27 now matches the impedance of the cable 12. This is the condition for optimum power transfer. It will be obvious that the circuit comprising the electrodes 14 and 15 and the strap 27 may be tuned over the entire operating range merely by pushing the proper push button to adjust the length of the strap 27 to insert or remove the proper amount of inductance.

The variable inductance tuner 18 has been used with success in dielectric heating systems. In these systems with electrodes 14 and 15 having dimensions of 64 inches by 88 inches and spaced from 6 to 14 inches apart, the capacitance of the condenser provided by the electrodes 14 and 15 varied between approximately 1500 M. M. F. and 250 M. M. F. during the process of heating a charge. This is a capacity tuning ratio of 1500/250 or 6:1. This means that the variable inductance required to tune the circuit over the entire heating cycle also had a tuning ratio of 6:1. It is seen that this ratio is considerably higher than the tuning ratio anticipated by the prior art.

Although we have illustrated our variable inductance strap tuner 18 for tuning a high frequency heating circuit for optimum power transfer to the energy utilizing system or heating electrodes, it is understood that it may be used in any application where a variable inductance is required.

From the foregoing description, it is seen that we have provided an improved strap type variable inductance which is adaptable for tuning high frequency LC circuits over a substantial range.

While we have shown our invention in one form only, it will be obvious to those skilled in the art that it is not so limited, but is susceptible of various changes and modifications without departing from the spirit thereof, and we desire, therefore, that only such limitations shall be placed thereupon as are specifically set forth in the appended claims.

We claim as our invention:

1. A variable inductor comprising a strap formed into a single loop with one end thereof fixedly anchored, and means for varying the perimeter of said loop to vary said inductance.

2. A variable inductor comprising a strap formed into a single loop with one end thereof fixedly anchored, and means associated with one end of said strap for varying the perimeter of said loop to vary said inductance.

3. A variable inductance tuner comprising a flexible conductive strap formed into a single loop having one end thereof fixedly anchored, and means including a roll about which one end of said strap is wound for varying the length of said strap to vary said inductance.

4. Apparatus for varying the impedance of a circuit having inductance and capacitance comprising a strap formed into a single loop with one end thereof fixedly anchored and means for varying the perimeter of said loop to vary the inductance of said circuit over a range such as to produce a tuning ratio of six to one.

5. A variable inductor comprising an electrical conductor formed into a single loop with one end thereof fixedly anchored and means for varying the perimeter of said conductor to vary the inductance of said inductor.

6. In combination: a strap formed into a single loop with one end thereof fixedly anchored, means for varying the perimeter of said loop to vary the inductance of said loop, connections for applying high frequency electrical oscillations to said loop.

WILLIAM H. ANDERSON.
ALBERT C. FREY.

REFERENCES CITED

The following references are of record in the file of this patent:

UNITED STATES PATENTS

| Number | Name | Date |
|---|---|---|
| 928,371 | Fessenden | July 20, 1909 |
| 1,909,610 | Carter | May 16, 1933 |
| 1,911,980 | Vance | May 30, 1933 |
| 2,092,069 | Hollman | Sept. 7, 1937 |
| 2,247,212 | Trevor | June 24, 1941 |
| 2,308,043 | Bierwirth | Jan. 12, 1943 |
| 2,367,576 | Harvey et al. | Jan. 16, 1945 |
| 2,396,004 | Gilbert | Mar. 5, 1946 |
| 2,414,280 | Thomas | Jan. 14, 1947 |
| 2,438,477 | Dodds et al. | Mar. 23, 1948 |
| 2,464,404 | Gillespie | Mar. 15, 1949 |

FOREIGN PATENTS

| Number | Country | Date |
|---|---|---|
| 226,586 | Great Britain | Dec. 29, 1924 |
| 234,331 | Great Britain | May 28, 1925 |

OTHER REFERENCES

Publication: Scott, "The Role of Frequency in Industrial Dielectric Heating," Transactions, Electrical Engineering, August 1945, pages 558–562.